United States Patent
Clift

(10) Patent No.: US 6,513,100 B1
(45) Date of Patent: Jan. 28, 2003

(54) SYSTEM AND METHOD FOR FAST REFERENCING A REFERENCE COUNTED ITEM

(75) Inventor: Neill Clift, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 09/738,568

(22) Filed: Dec. 15, 2000

Related U.S. Application Data

(60) Provisional application No. 60/244,314, filed on Oct. 30, 2000.

(51) Int. Cl.[7] .............................................. G06F 12/00
(52) U.S. Cl. ...................................... 711/154; 711/156
(58) Field of Search ................................... 711/154, 156

(56) References Cited

PUBLICATIONS

Richard Anstee, et al.; "Low Discrepancy Allocation of Two–Dimensional Data", Foundations of Information and Knowledge Systems. First International Symposium, FoLKS 2000., vol. 1762, 2000, p. 1–12.

Onodera, T., et al.; "A Study of Locking Objects with Bimodal Fields", SIGPLAN Notices, vol. 34, No. 10, Oct. 1999, p. 223–237.

Alperns, B., et al.; "The Jalapeno Virtual Machine", IBM Systems Journal, vol. 39, No. 1,2000, p. 211–236.

Primary Examiner—Jack A. Lane
(74) Attorney, Agent, or Firm—Amin & Turocy, LLP

(57) ABSTRACT

A system and method for fast referencing a reference counted item is provided. The system provides for establishing a reference counted item, establishing a fast referencing item, setting a pointer to the reference counted item and storing a local copy of the reference counted item in the pointer to the reference counted item, the pointer being associated with the fast referencing item. The system and method thus allow items to obtain references to the reference counted item from the fast referencing item without employing a locking algorithm wherein the reference counted item is locked, accessed, and unlocked.

34 Claims, 13 Drawing Sheets

SYSTEM AND METHOD FOR FAST REFERENCING A REFERENCE COUNTED ITEM

REFERENCE TO RELATED APPLICATION

This application claims the benefit of U.S. Provisional Patent Application No. 60/244,314, which was filed Oct. 30, 2000, entitled SYSTEM AND METHOD FOR FAST REFERENCING A REFERENCE COUNTED ITEM.

TECHNICAL FIELD

The present invention relates generally to computer programming. More particularly the invention relates to fast referencing of a reference counted item.

BACKGROUND

Reference counting is employed in memory management systems. A reference counted item keeps a count of how many references there are thereto. Items to which there are no references may be reclaimed as available memory. Reference counts are typically begun at a count of one, incremented by one for each reference added, and decremented by one for each reference removed. In such a system, when a reference count falls to zero, the item is no longer required and may be recycled, thus freeing associated memory. Maintaining an accurate reference count is important to memory management. For example, if a reference count indicated that there were no references to an item, and there was an application referring to the reference counted item, and the reference counted item was deleted, then the application could experience an "unresolved pointer" problem, or the application could be reading memory that no longer represented the item associated with the application. By way of further illustration, if a reference count indicated that there were references to an item, but there was no entity referring to that item, then the item would not be reclaimed, and the system with which the reference counted item was associated could suffer from a "memory leak" problem. Thus, it is important to ensure that reference counts are accurately maintained. Therefore, reference counts are frequently protected by locks, which facilitate only one entity accessing a reference count at one time, which mitigates unresolved pointer and memory leak problems. But the locking mechanism creates contention problems, when, for example, two or more entities seek to acquire the lock at the same point in time. Entities other than the entity that acquired the lock must wait, which negatively impacts system performance.

Operating systems, multi-threaded applications, and servers, for example, often maintain data structures with which changeable sub-data is associated. For example, a user of a computer system may have a profile, which includes a set of access rights (e.g. can read files, cannot write files). To access the sub-data, (e.g. the access rights) a conventional reference counting method acquires a lock protecting the pointer to the sub-data, fetches the pointer to the sub-data, increments the reference count associated with the sub-data and then releases the lock. Thus, locking and unlocking operations are employed for each access of the sub-data, which slows down processing of such operating systems, multi-threaded applications and servers, for example, due to the contention problem described above. As the number of concurrent processors accessing the sub-data increases, the performance of the conventional lock, fetch, increment, release lock method declines rapidly as more entities contend for the lock. Such a method is particularly wasteful of system resources (e.g. cpu cycles) when the sub-data is frequently read but rarely changed.

Thus, a system and method for fast referencing a reference counted item where the performance of the method does not decline so rapidly is required.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method for fast referencing a reference counted item to facilitate performance of multi-threaded applications and/or systems employing concurrent processors. In the present invention, a fast referencing item establishes a reference count in the reference counted item to a value greater than one, establishes a pointer to the reference counted item and stores a local value associated with the reference count, known as a fast reference count (FRC). The initial FRC value is greater than the number of referencing items referencing the reference counted item.

By establishing the number of references in the reference counted item at more than one, the referencing item can be viewed as having acquired more than one reference. The "extra" references are then available to subsequent items seeking a reference to the reference counted item, and under certain conditions, such subsequent acquiring items will not be required to acquire a lock, change the reference count and release the lock. Rather, the subsequent acquiring items may examine the number of references available in the fast referencing item and acquire (e.g. "steal/borrow") one or more of the "extra" references. When acquiring a reference using this method, an atomic operation (e.g. InterlockedCompareExchange( )) is employed to change the FRC in the fast referencing item to facilitate maintaining an accurate count of the references to the reference counted item. A fast referencing item that acquires more than one reference, can itself be examined for available references and can have one or more of its available references acquired.

The FRC may be stored in a variable, or in one or more bits in the pointer. Such bits may be available if, for example, the reference counted item is located in a memory area where items are aligned on eight byte boundaries (freeing, for example, the low order three bits of the pointer), or if other bits in the pointer are available. The bits employed to store the FRC may be contiguous in the pointer, or they may be distributed throughout the pointer.

The system and method thus facilitates obtaining references to a reference counted item without employing a locking algorithm wherein a lock is acquired, a reference is acquired and the lock is released. Thus, performance degradation due to contention problems that arise when multiple entities are seeking to acquire the lock to the reference counted item is mitigated.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1A:
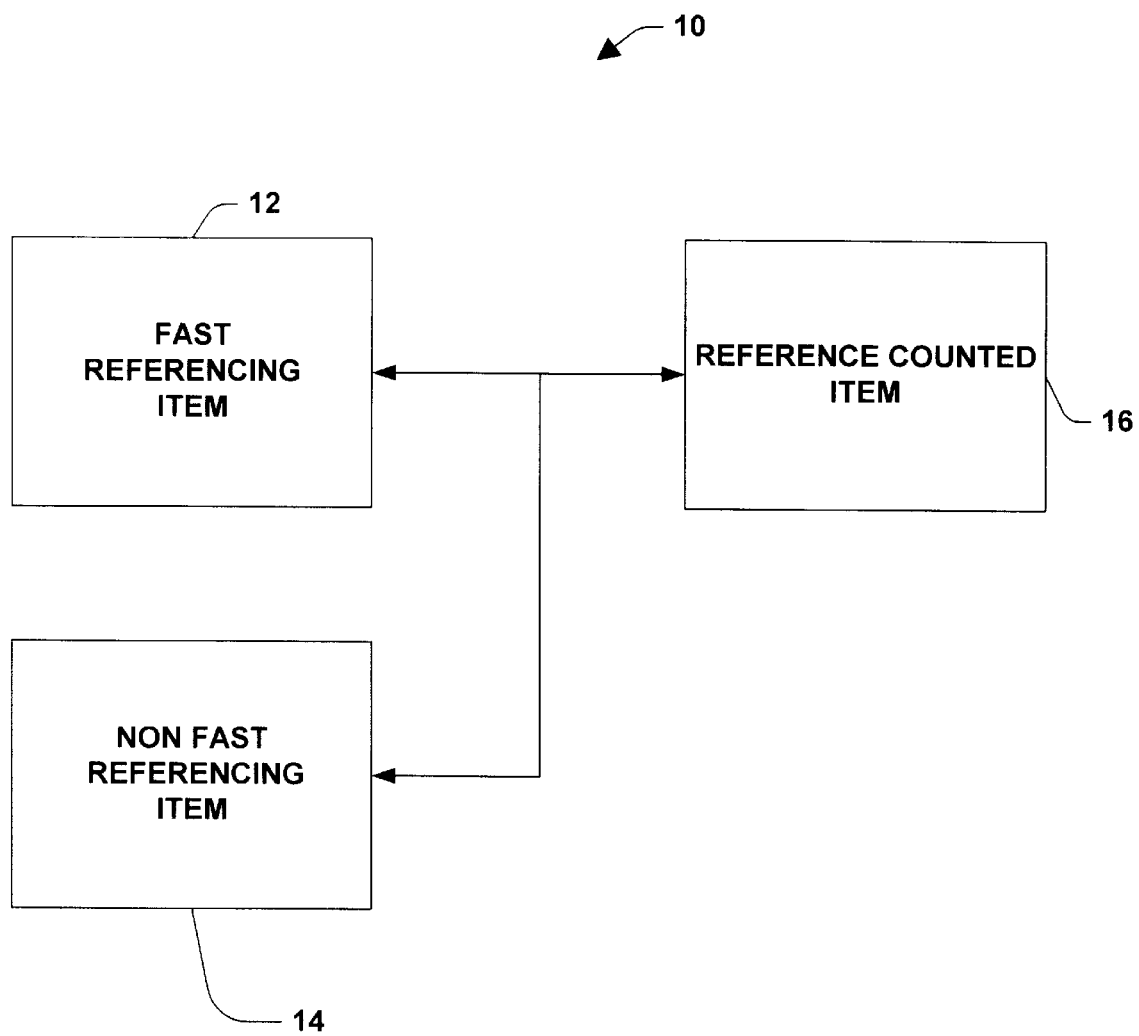
FIG. 1A is schematic block diagram illustrating a reference counted item being accessed in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

Referring initially to FIG. 1A, a system 10 for fast referencing a reference counted item 16 is illustrated. Both a fast referencing item 12 and non-fast referencing item 14 are illustrated. The reference counted item 16 may be, for example, a memory location, a data structure, and/or an object. The reference counted item 16 may be employed, for example, in association with a computer user profile. The profile may contain invariant data and variable data. The variable data may be, for example, the computer user's credentials concerning reading, writing and executing files. The variable data may be associated with a reference count in the reference counted item 16. Although the variable data can change, if it is unlikely to change, then a local value associated with the count of the references to the variable data is suitable for caching in the fast referencing item 12. The local value associated with the count of references to the variable data is thus available to other fast referencing items 12 and non-fast referencing items 14.

Figure 1B:
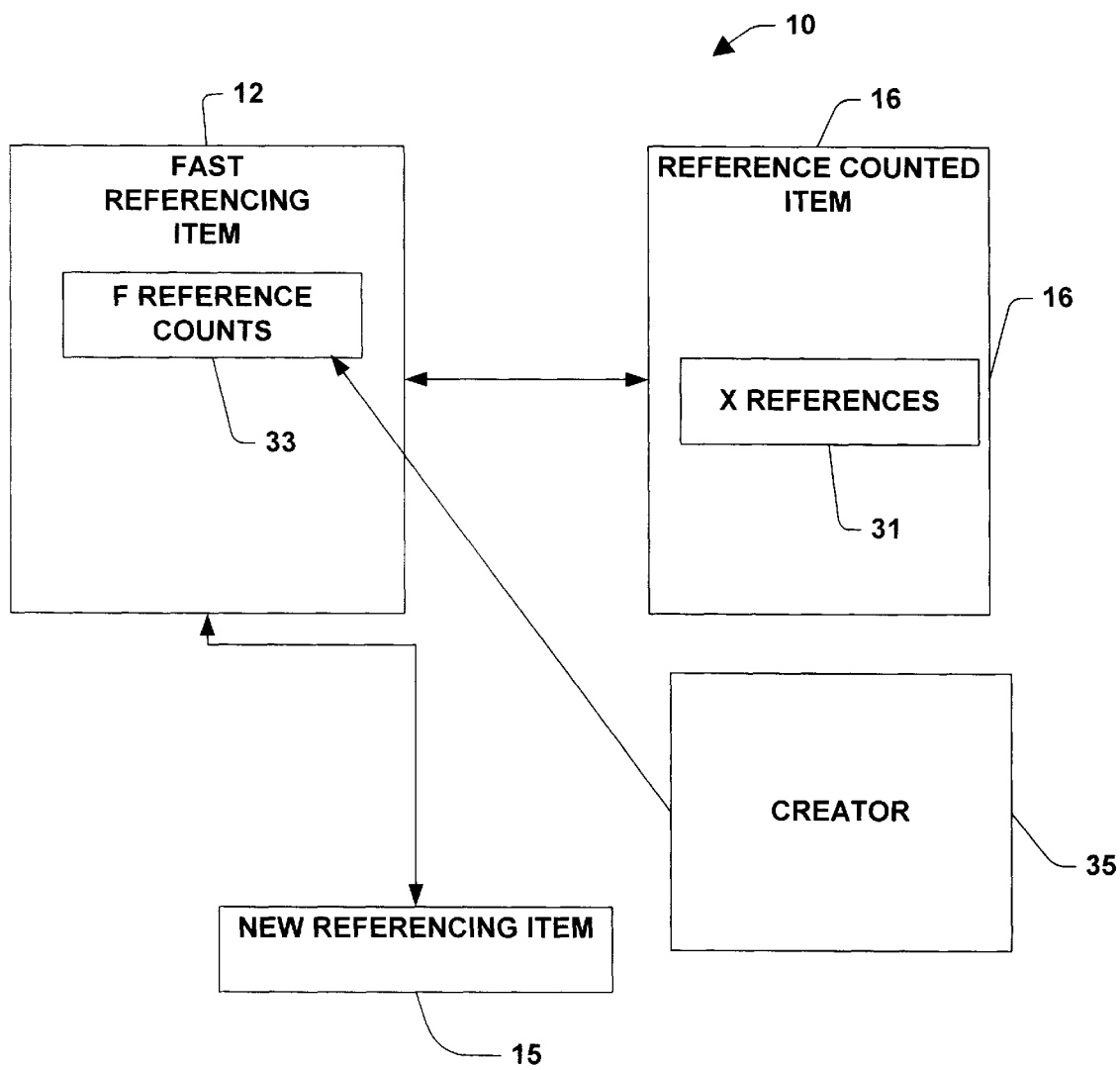
FIG. 1B is a schematic block diagram illustrating a fast referencing count associated with a fast referencing item in accordance with an aspect of the present invention.

Turning now to FIG. 1B, the fast referencing item 12 is illustrated including a fast reference count 33 (FRC), which holds a value representing F references, which are related to the count of references X stored in a reference count 31 in the reference counted item 16. The FRC 33 can be created by a fast reference count creator 35. For example, an operating system reference count manager may function as the fast reference count creator 35 and create the fast reference count 33. The fast reference count creator 35 can be a computer related entity, either hardware, a combination of hardware and software, software, or software in execution. For example, the fast reference count creator 35 can be a process running on a processor, an operating system component, a processor, an object, an executable, a thread of execution, a program and a computer. The value of F is initially set to a value greater than the actual number of items referencing the reference counted item 16, which facilitates subsequent referencing items to acquire references from the fast referencing item 12. FIG. 1B also illustrates a new referencing item 15 that can attempt to acquire a reference to the reference counted item 16 from the fast referencing item 12 by employing the FRC 33, thus mitigating problems associated with acquiring and releasing a lock associated with the reference counted item 16. For example, the new referencing item 15 can utilize a count value from the FRC 33 in its attempt to reference the reference counted item 16. Thus, by the FRC 33 having extra reference counts that may be employed by other referencing items, the FRC 33 facilitates quick referencing of the reference counted item 16 by the other referencing items.

Figure 2:
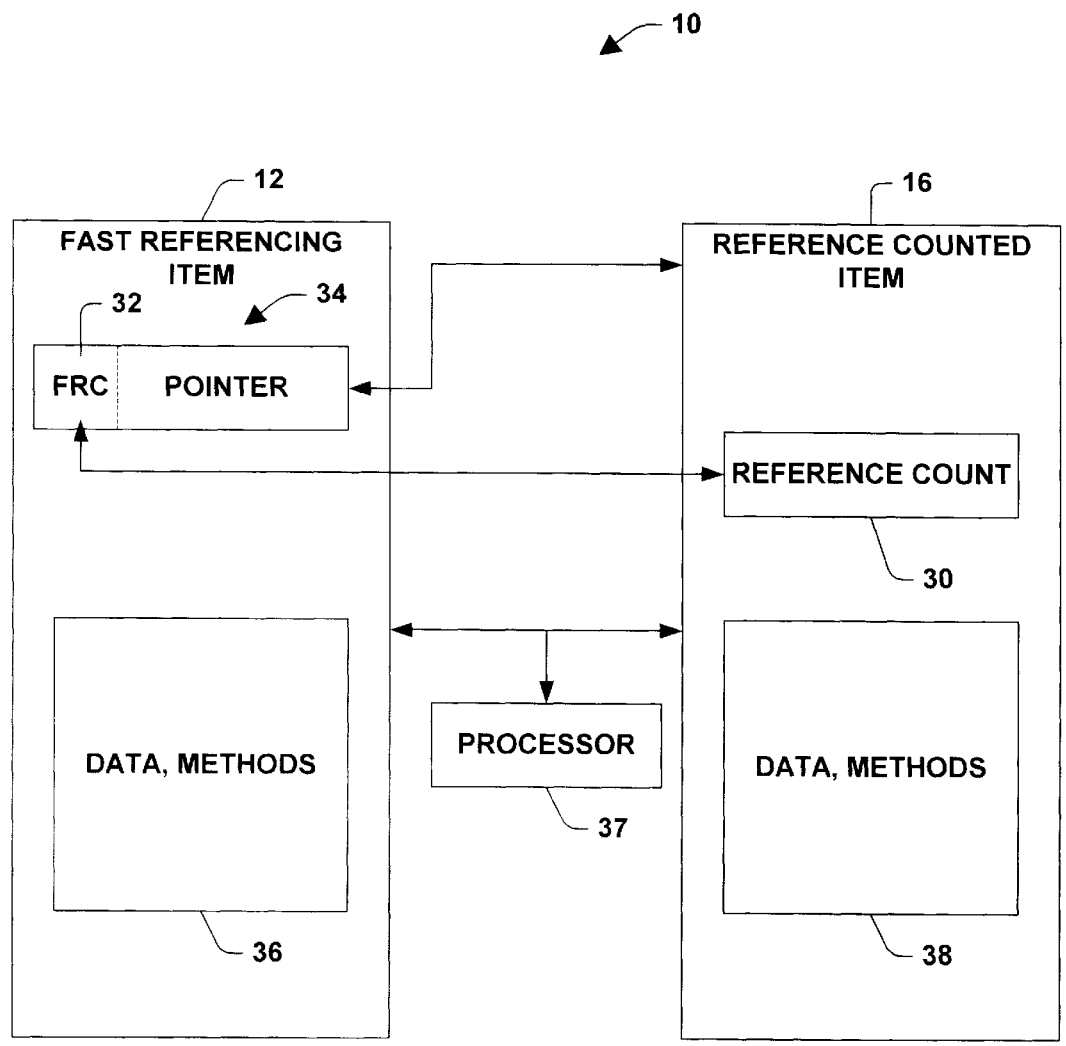
FIG. 2 illustrates a local value associated with the reference count in a reference counted item being stored in a pointer to the reference counted item in accordance with an aspect of the present invention.

Turning now to FIG. 2, the system 10 is illustrated in more detail. The reference counted item 16 includes a reference count 30, which is a count of how many items are referring to the reference counted item 16. The reference counted item 16 may also include other information, for example, data and/or methods 38. The fast referencing item 12 maintains a pointer 34 to the reference counted item 16, and also maintains a local value, (which can be part of the pointer), associated with the reference count 30, which shall be referred to herein as a fast reference count 32 (FRC). In accordance with an aspect of the present invention, when creating the reference counted item 16, the fast referencing item 12 acquires a lock to the reference counted item 16, establishes the reference count 30 to a value greater than one, and releases the lock. Even though the fast referencing item 12 is only one item referring to the reference counted item 16, by establishing the reference count 30 at a number greater than the actual number of items referencing the reference counted item 16, the extra references acquired by the fast referencing item 12 may, under certain conditions, be acquired by other fast referencing items 12 and non-fast referencing items 14 (FIG. 1) without the requirement of acquiring and releasing a lock. One such condition exists when a fast referencing item 12 seeks to read but not change the values in the sub-data associated with the reference count 30. Another such condition exists when a non-fast referencing item 14 seeks to read but not change the values in the sub-data associated with the reference count 30. If either a fast referencing item 12 or a non-fast referencing item 14 seeks to change the sub-data associated with the reference count 30, then those items will employ the conventional acquire lock, access, release lock method.

But when a subsequent acquiring item seeks to acquire a reference to enable reading data associated with the reference count 30, then the acquiring item may employ a processor 37 to examine the FRC 32 in the fast referencing item 12 to determine whether any references are available to be acquired by the acquiring item. If one or more references are available to be acquired, then the acquiring item causes an atomic operation (e.g. InterlockedCompareExchange( )) to performed on the processor 37 to decrease the FRC 32 by the number of references acquired by the acquiring item, and establishes its own local reference count. Examining the FRC 32, performing the atomic update operation and establishing a local reference count in the acquiring item are performed without the processor 37 acquiring and releasing a lock. Thus contention problems associated with conventional methods for acquiring a reference to the reference counted item 16 are mitigated. If the acquiring item is a fast referencing item 12, then the acquiring item may in turn have an FRC 32 examined and be manipulated by other subsequent acquirers. The processor 37 may be a computer-related entity, either hardware, a combination of hardware and software, software, or software in execution. For example, a processor may be a process running on a microprocessor, a microprocessor, an object, an executable, a thread of execution, a program and a computer. By way of illustration, both an application running on a server and the server can be processors.

Figure 3:
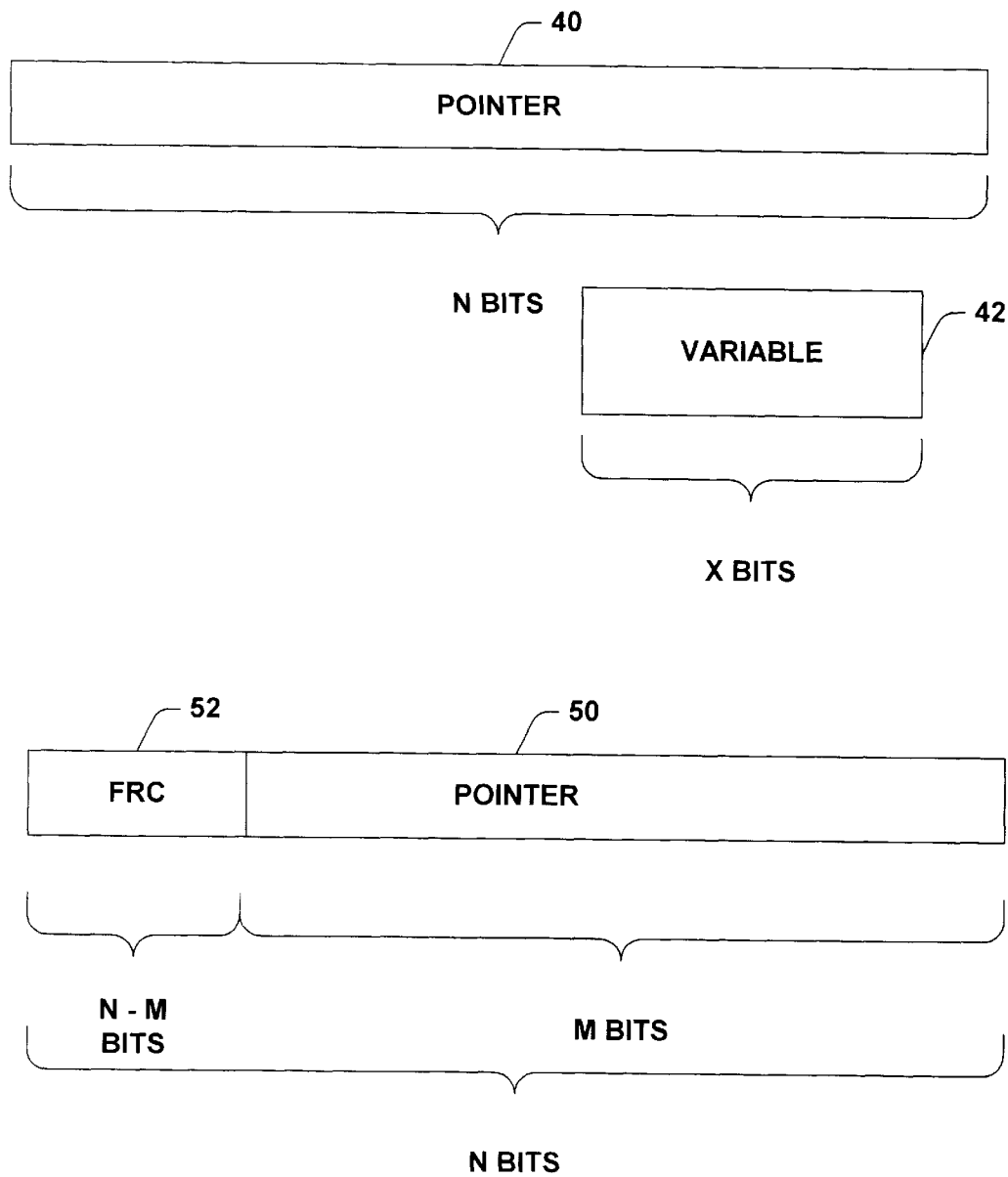
FIG. 3 illustrates a conventional pointer and a pointer adapted to store a local value associated with a reference count, in accordance with an aspect of the present invention.

Turning now to FIG. 3, two exemplary methods for storing a fast reference count 52 (FRC) are illustrated. In the first method, a pointer 40, consisting of N bits, and a variable 42, consisting of X bits are employed. The pointer 40 holds the address of the reference counted item 16 (FIG. 1), while the variable 42 holds the fast reference count 52 (FRC). In a second method, a pointer 50 consisting of N bits, is partitioned into two parts, a pointer portion consisting of M bits and the FRC 52 part consisting of N-M bits. For example, the pointer 50 may consist of thirty-two bits, twenty-nine of which are allocated to storing the address of the reference counted item 16 (FIG. 1) while three are allocated to store the FRC 52. Bits from the pointer 50 can be employed to store the FRC 52 when not all the N bits are required to store the address of the reference counted item 16 (FIG. 1). For example, if the reference counted item 16 is located in a memory area where data items are aligned on eight byte boundaries then three of the thirty-two bits are not required to store the address. The three available bits can thus be used to store the FRC 52, with a value ranging from zero to seven. In FIG. 3, the three bits employed to store the FRC 52 are illustrated contiguous to each other, however, as is described below in connection with FIG. 4, the bits do not have to be contiguous. It is to be appreciated by one skilled in the art that although thirty-two bits and three bits are discussed above, that a greater or lesser number of bits may be employed in accordance with the present invention.

An advantage of the second method over the first method is that by using bits available in the pointer 50, memory requirements can be reduced, and processing speed can be increased. For example, one memory lookup can be employed to resolve the address in the pointer 50 and to retrieve the FRC 52 versus two memory lookups in the first method. In either case, the FRC 52 may be examined without acquiring a lock by subsequent acquiring items to determine whether references are available to be acquired. If references are available, and the subsequent acquiring item seeks to read but not change the sub-data associated with the reference count 30 (FIG. 2), then the subsequent acquiring item may perform, without acquiring and releasing a lock, the atomic operation to change the FRC 52. Thus, problems associated with contending for locks to acquire references to a reference counted item are mitigated.

Figure 4:
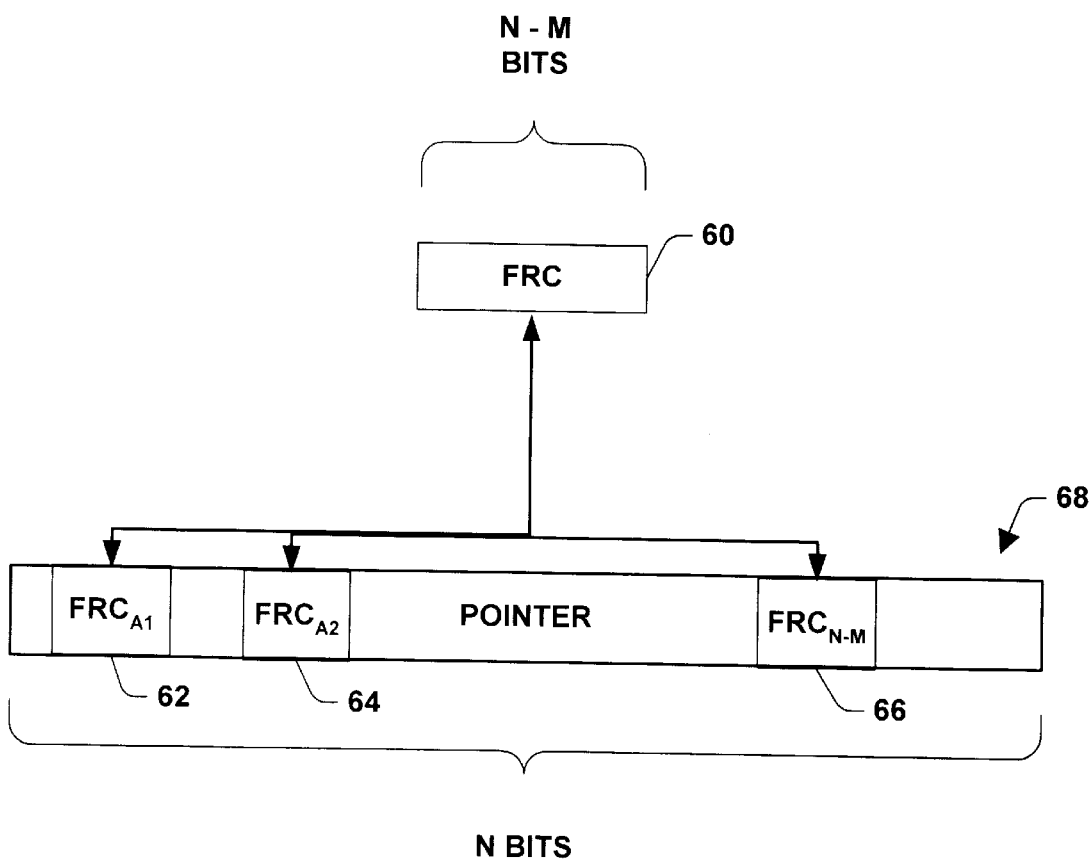
FIG. 4 illustrates another pointer adapted to store a local value associated with a reference count, in accordance with an aspect of the present invention.

FIG. 4 illustrates a pointer 68 adapted to store a fast reference count 60 (FRC) where the bits employed to store the FRC 60 are not contiguous. The pointer 68 can have N bits. If M bits are required to store the address of the reference counted item 16 (FIG. 1), then N-M bits are available to store the FRC 60. In FIG. 4, the N-M bits, $FRC_{AA1}$ 62, $FRC_{A2}$ 64 through $FRC_{N-M}$ 66 are distributed throughout the pointer 68. Although the N-M bits are illustrated distributed left to right in the pointer 68, it is to be appreciated by one skilled in the art that any suitable distribution of the N-M bits may be employed in the present invention.

Figure 5:
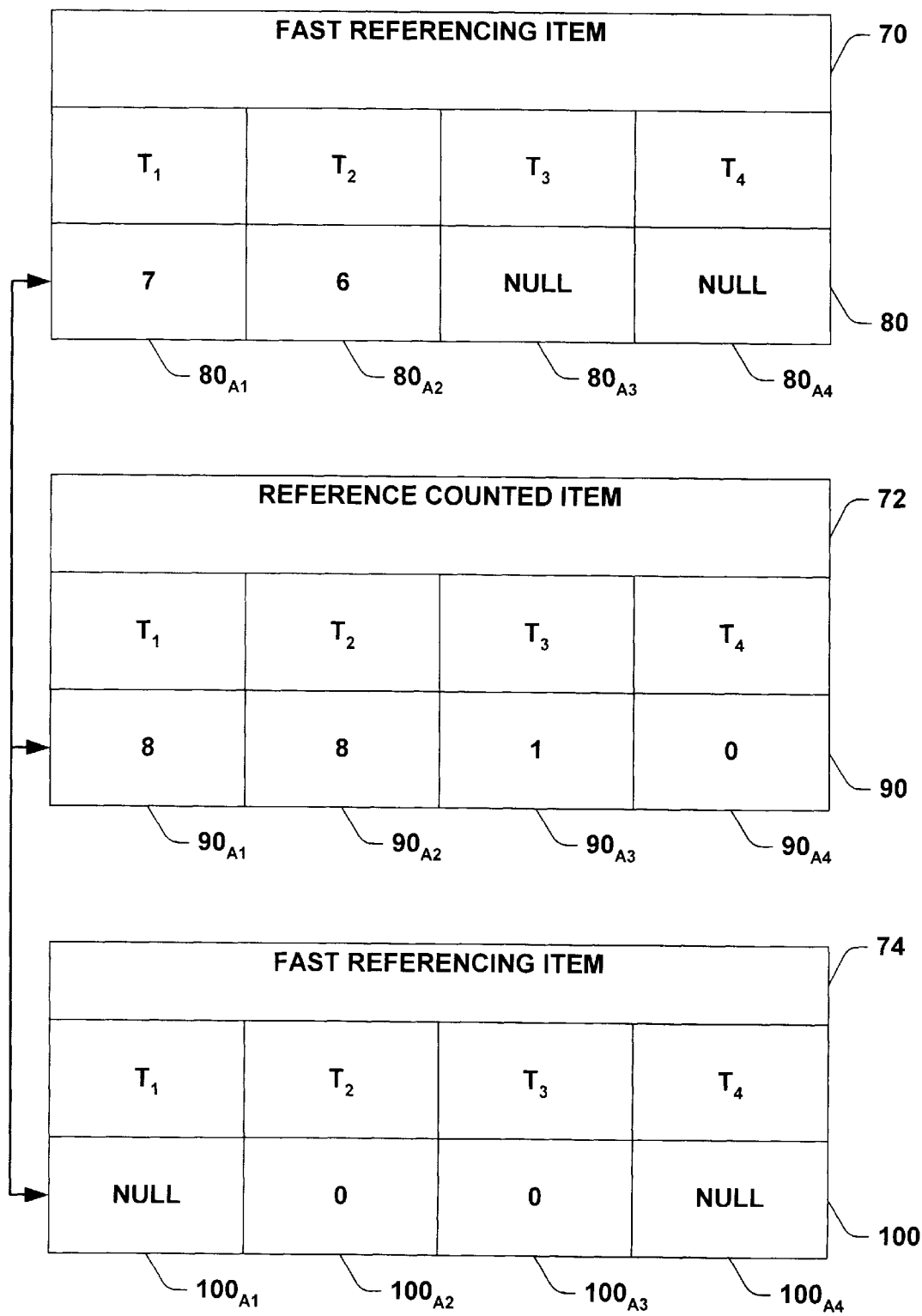
FIG. 5 is a timing diagram, illustrating a reference count in a reference counted item and the local values associated with the reference count in referencing items, in accordance with the present invention.

FIG. 5 is a timing diagram, illustrating a reference count 90 in a reference counted item 72 as the reference count 90 is established and manipulated. A fast referencing item 70 establishes the reference counted item 72. In establishing the reference counted item 72, the fast referencing item 70 establishes the reference count 90 and a fast reference count 80. The reference count 90, the fast reference count 80, and a fast reference count 100 are illustrated at four different times $T_1$, $T_2$, $T_3$ and $T_4$. $T_1$ corresponds to the point in time where the fast referencing item 70 is created and in turn creates the reference counted item 72. The fast referencing item 70 establishes a reference count $90_{A1}$ with a value eight, indicating that eight items are referencing the reference counted item 72. But at time $T_1$, only one item is referencing the reference counted item 72. Thus, seven references to the reference counted item 72 are available to be acquired by other items that seek to read, but not change, the sub-data associated with the reference counted object 72. At time $T_1$, a second fast referencing item 74 has not yet been created, and thus there is no defined value for the fast reference count $100_{A1}$. At time $T_2$, the fast referencing item 74 is created. The fast referencing item 74 seeks to read, but not change the sub-data associated with the reference counted item 72, and thus the fast referencing item 74 can attempt to acquire a reference from the fast referencing item 70. The fast referencing item 74 examines the FRC $80_{A1}$, determines that references are available, and causes an atomic update of the FRC $80_{A1}$ to reduce the FRC $80_{A1}$ by the one reference that the fast referencing item 74 is acquiring. An atomic operation is required to facilitate no other concurrently acquiring item examining and changing the FRC $80_{A1}$ concurrently with the fast referencing item 74. When the atomic operation is completed, at time $T_2$, the fast referencing item 70 has an FRC $80_{A2}$ reduced to six, indicating that six references are available to be acquired, while the fast referencing item 74 has an FRC $100_{A2}$ set to zero, indicating that it has no references available to be acquired. The reference count $90_{A2}$ in the reference counted object 72 does not change since one reference is in use by the fast referencing item 70, one reference is in use by the fast referencing item 74, and six references are listed as available from the fast referencing item 70, which adds up to the eight references indicated in the reference count $90_{A2}$. In an alternative example, the fast referencing item 74 can acquire more than one reference from the fast referencing item 70, in which case the fast reference count $80_{A2}$ is reduced by the number of references acquired by the fast referencing item 74, and the fast reference count $100_{A2}$ is set to one less than the number of references acquired, indicating the number of references available to be acquired from the fast referencing item 74. After such an alternative acquisition, both the fast referencing item 70 and the fast referencing item 74 are available to be examined to determine whether either still has adequate references for other items to acquire.

At time $T_3$, the fast referencing item 70 loses interest in the reference counted item 72, and thus changes a reference count $90_{A3}$ to one, indicating that the six "extra" references are no longer available, and that the one reference consumed by the fast referencing item 70 is no longer in use. The fast referencing item 70 sets an FRC $80_{A3}$ to a null value, indicating that the fast referencing item 70 is no longer referencing the reference counted item 72. The value one in the reference count $90_{A3}$ correctly indicates that one item, the fast referencing item 74 is referring to the reference counted item 72.

At time $T_4$, the fast referencing item 74 loses interest in the reference counted item 72, and thus changes a reference count $90_{A4}$ to zero, indicating that no items are referencing the reference counted object 72. The zero in the reference count $90_{A4}$ indicates that the memory associated with the reference counted item 72 can be reclaimed by, for example, a garbage collection process. The fast referencing item 74 sets an FRC $100_{A4}$ to a null value, indicating that the fast referencing item 74 is no longer referencing the reference counted item 72.

It is to be appreciated by one skilled the art that although the fast referencing item 70 initially established a count of eight in the reference counted item 72, that any suitable value greater than one may be established in the reference counted item 72 to facilitate subsequent acquiring items acquiring a reference to the reference counted item 72 without acquiring and releasing a lock. Thus, problems associated with contention for a lock are mitigated. It is to be further appreciated that the fast referencing item 74 may acquire more than one reference from the fast referencing item 70.

Figure 6:
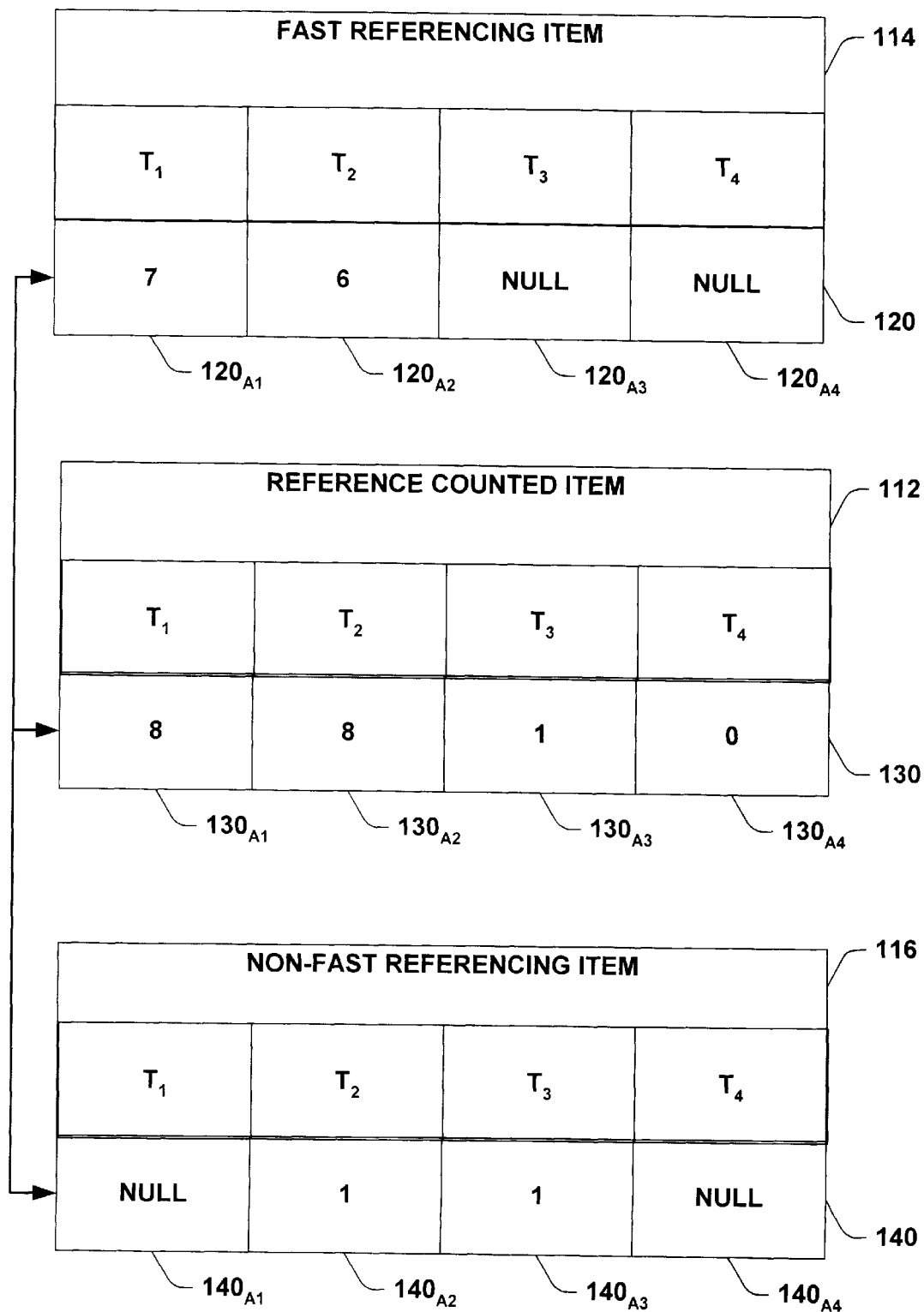
FIG. 6 is another timing diagram, illustrating a reference count in a reference counted item and the local values associated with the reference count in referencing items, in accordance with the present invention.

FIG. 6 is a timing diagram, illustrating a reference count 130 in a reference counted item 112 as the reference count 130 is established and manipulated. A fast referencing item 114 establishes the reference counted item 112. In establishing the reference counted item 112, the fast referencing item 114 establishes the reference count 130 and a fast reference count 120. The reference count 130, the fast reference count 120, and a non-fast reference count 140 are illustrated at four different times $T_1$, $T_2$, $T_3$ and $T_4$. $T_1$ corresponds to the point in time where the fast referencing item 114 is created and in turn creates the reference counted item 112. The fast referencing item 114 establishes a reference count $130_{A1}$ with a value eight, indicating that eight items are referencing the reference counted item 112. But at time $T_1$, only one item is referencing the reference counted item 112. Thus, seven references to the reference counted item 112 are available to be acquired by other items that seek to read, but not change, the sub-data associated with the reference counted object 112. At time $T_1$, a non-fast referencing item 116 has not yet been created, and thus there is no defined value for a non-fast reference count $140_{A1}$.

At time $T_2$, the non-fast referencing item 116 is created. The non-fast referencing item 116 seeks to read, but not change the sub-data associated with the reference counted item 112, and thus the non-fast referencing item 116 attempts to acquire a reference from the fast referencing item 114. The non-fast referencing item 116 examines an FRC $120_{A1}$, determines that references are available, and causes an atomic update of the FRC $120_{A1}$ to reduce the FRC $120_{A1}$ by the one reference that the non-fast referencing item 116 is acquiring. An atomic operation is required to facilitate no other concurrently acquiring item examining and changing the FRC $120_{A1}$ concurrently with the non-fast referencing item 116. When the atomic operation is completed, at time $T_2$, the fast referencing item 114 has an FRC $120_{A2}$ reduced to six, indicating that six references are available to be acquired, while the non-fast referencing item 116 has an FRC $140_{A2}$ set to one, indicating that it is consuming a reference. The non-fast referencing item 116 can not be used to acquire references from and thus its non-fast reference count 140 does not indicate that references are available, but rather that it is consuming a reference. A reference count $130_{A2}$ in the reference counted object 112 does not change since one reference is in use by the fast referencing item 114, one reference is in use by the non-fast referencing item 116, and six references are listed as available from the fast referencing item 114, which adds up to the eight references indicated in the reference count $130_{A2}$.

At time $T_3$, the fast referencing item 114 loses interest in the reference counted item 112, and thus changes a reference count $130_{A3}$ to one, indicating that the six "extra" references are no longer available, and that the one reference consumed by the fast referencing item 114 is no longer in use. The fast referencing item 114 sets an FRC $120_{A3}$ to a null value, indicating that the fast referencing item 114 is no longer referencing the reference counted item 112. The value one in a reference count $130_{A3}$ correctly indicates that one item, the non-fast referencing item 116 is referring to the reference counted item 112.

At time $T_4$, the non-fast referencing item 116 loses interest in the reference counted item 112, and thus changes a reference count $130_{A4}$ to zero, indicating that no items are referencing the reference counted object 72. The zero in reference count $130_{A4}$ indicates that the memory associated with the reference counted item 112 can be reclaimed by, for example, a garbage collection process. The non-fast referencing item 116 sets an FRC $140_{A4}$ to a null value, indicating that the non-fast referencing item 116 is no longer referencing the reference counted item 112.

It is to be appreciated by one skilled the art that although the fast referencing item 114 initially established a count of eight in the reference counted item 112, that any suitable value greater than one may be established in the reference counted item 112 to facilitate subsequent acquiring items acquiring a reference to the reference counted item 112 without acquiring and releasing a lock. Thus, problems associated with contention for a lock are mitigated.

Figure 7:
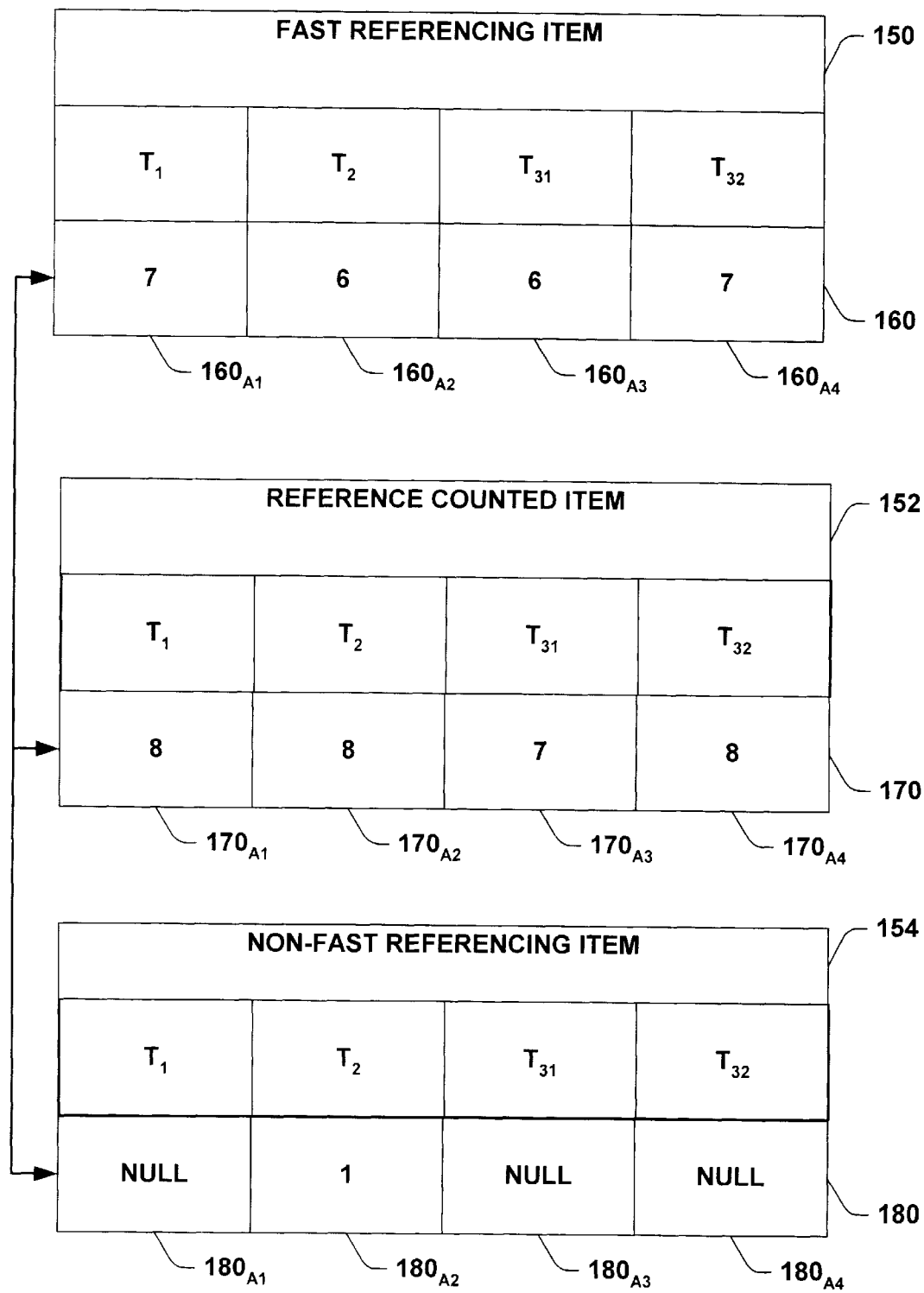
FIG. 7 is another timing diagram, illustrating a reference count in a reference counted item and the local values associated with the reference count in referencing items, in accordance with the present invention.

FIG. 7 is a timing diagram, illustrating a reference count 170 in a reference counted item 152 as the reference count 170 is established and manipulated. A fast referencing item 150 establishes the reference counted item 152. In establishing the reference counted item 152, the fast referencing item 150 establishes the reference count 170 and a fast reference count 160. The reference count 170, the fast reference count 160, and a non-fast reference count 180 are illustrated at four different times $T_1$, $T_2$, $T_3$ and $T_4$. $T_1$ corresponds to the point in time where the fast referencing item 150 is created and in turn creates the reference counted item 152. The fast referencing item 150 establishes a reference count $170_{A1}$ with a value eight, indicating that eight items are referencing the reference counted item 152. But at time $T_1$, only one item is referencing the reference counted item 152. Thus, seven references to the reference counted item 152 are available to be acquired by other items that seek to read, but not change, the sub-data associated with the reference counted object 152. At time $T_1$, a non-fast referencing item 154 has not yet been created, and thus there is no defined value for a non-fast reference count $160_{A1}$. At time $T_2$, the non-fast referencing item 154 is created. The non-fast referencing item 154 seeks to read, but not change the sub-data associated with the reference counted item 152, and thus the non-fast referencing item 154 can attempt to acquire a reference from the fast referencing item 150. The non-fast referencing item 154 examines an FRC $160_{A1}$, determines that references are available, and causes an atomic update of the FRC $160_{A1}$ to reduce the FRC $160_{A1}$ by the one reference that the non-fast referencing item 154 is acquiring. An atomic operation is required to facilitate no other concurrently acquiring item examining and changing the FRC $160_{A1}$ concurrently with the non-fast referencing item 154. When the atomic operation is completed, at time $T_2$, the fast referencing item 150 has an FRC $160_{A2}$ reduced to six, indicating that six references are available to be acquired, while the non-fast referencing item 154 has its non-fast reference count $160_{A2}$ set to one, indicating that it is consuming a reference. The non-fast referencing item 154 can not be used to acquire references from and thus its non-fast reference count 160 does not indicate that references are available, but rather that it is consuming a reference. A reference count $170_{A2}$ in the reference counted object 152 does not change since one reference is in use by the fast referencing item 150, one reference is in use by the non-fast referencing item 154, and six references are listed as available from the fast referencing item 150, which adds up to the eight references indicated in the reference count $170_{A2}$.

At least two methods are available for the non-fast referencing item 154 to release acquired references when it loses interest in the reference counted item 170. In a first method, the non-fast referencing object 154 de-references the reference counted item 152 directly. Thus, at time $T_{31}$, the non-fast referencing item 154 loses interest in the reference counted item 152, and changes a reference count $170_{A3}$ to seven, indicating that the one reference consumed by non-the fast referencing item 154 is no longer in use. The non-fast referencing item 154 sets an FRC $160_{A3}$ to a null value, indicating that the non-fast referencing item 154 is no longer referencing the reference counted item 152. The value seven in the reference count $170_{A3}$ correctly indicates that one item, the fast referencing item 150 is referring to the reference counted item 152 and that it has six "extra" references still available for acquisition by other items.

In another method the non-fast referencing item 154 may return the reference it acquired from the fast referencing item 150. Thus at time $T_{32}$ the non-fast referencing object performs an atomic operation to increase a fast reference count $160_{A4}$ to seven, indicating that it has had the reference acquired by the non-fast referencing item 154 returned and that seven references are again available for acquisition.

Similarly, at least two methods are available for a fast referencing item to de-reference the reference counted item 152. In a first method, the fast referencing item can reduce the fast reference count 170 by the number of references released by the fast referencing item. In a second method, the fast referencing item can return the number of references acquired from another fast referencing item, leaving the reference count 170 unchanged. Before returning the acquired references to the fast referencing item from which they were acquired, the returning item will determine that the fast referencing item from which the references were acquired still exists and is available to have the references returned.

It is to be appreciated by one skilled the art that although the fast referencing item 150 initially established a count of eight in the reference counted item 152, that any suitable value may be established in the reference counted item 152 to facilitate subsequent acquiring items acquiring a reference to the reference counted item 152 without acquiring and releasing a lock. Thus, problems associated with contention for a lock are mitigated.

Figure 8:
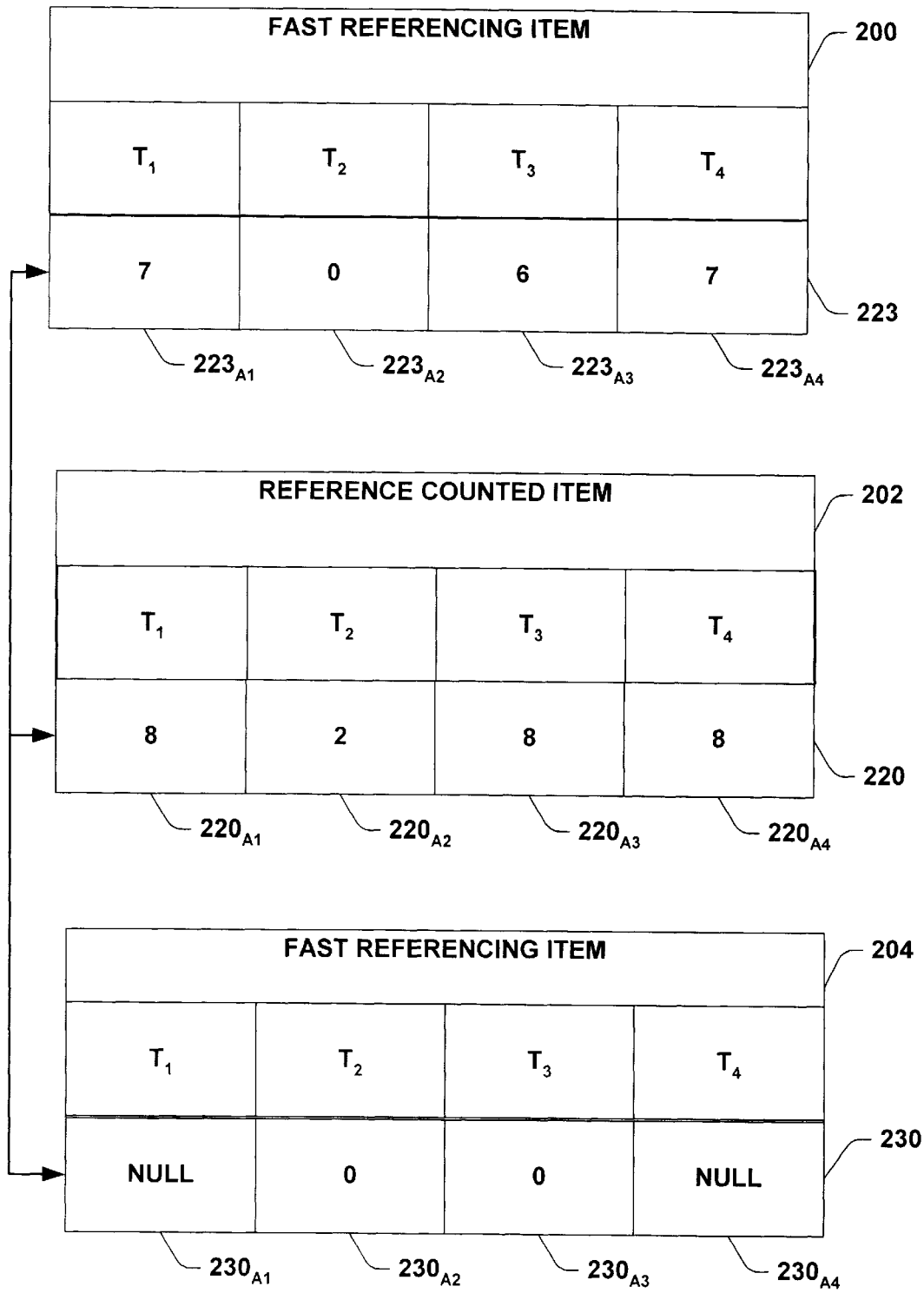
FIG. 8 is another timing diagram, illustrating a reference count in a reference counted item and the local values associated with the reference count in referencing items, in accordance with the present invention.

Turning now to FIG. 8, another timing diagram illustrating a reference counted item 202 is provided. At time $T_1$, a fast referencing item 200 is created and establishes the reference counted item 202. The fast referencing item 200 sets a reference count $220_{A1}$ to eight, indicating that the fast referencing item 200 has acquired eight references to the reference counted item 202. At time $T_1$, a fast referencing item 204 has not yet been created, and thus there is no value for a fast reference count $230_{A1}$. At time $T_1$, the fast referencing item 200 sets a fast reference count $223_{A1}$ to seven, indicating that it has seven references available to be acquired.

At time $T_2$, which may be some period of time later than time $T_1$, (e.g. many acquisitions and/or releases may have occurred), the fast referencing item 204 is created. The fast referencing item 204 examines the fast reference count 223, and determines it can acquire a reference from the fast reference item 200. In performing the atomic operation to reduce the fast reference count 223, the fast reference object 204 determines that it has forced a fast reference count $223_{A2}$ to zero. Thus, the fast referencing object 204 performs additional processing, to determine if additional references to the reference counted item 202 may be acquired. If more references may be acquired, then the fast referencing item 204 may acquire those references and keep them for itself or assign them to the fast referencing item 200. In FIG. 8, the fast referencing item 204 determines that references are available to the reference counted item 202 by examining a reference count $220_{A2}$. Since the reference count $220_{A2}$ is less than the maximum number of references allowed to the reference counted item 202, the fast referencing item 204 acquires a lock, changes the reference count $220_{A3}$ to eight at $T_3$ and assigns the additional references to the fast reference item 200 where a fast reference count $223_{A3}$ is increased to six. At time $T_4$, the fast referencing item 204 loses interest in the reference counted item 202 and thus returns its reference to the fast referencing item 200, increasing a fast reference count $223_{A4}$ to seven.

Although the fast referencing item 204 acquired six additional references to the reference counted item 202, it is to be appreciated by one skilled in the art that a greater or lesser number of references could have been acquired by the fast referencing item 204 in accordance with the present invention. Similarly, it is to be appreciated that although the fast referencing item 204 assigned six of the additionally acquired references to the fast referencing item 200, a lesser number can be assigned, and a greater number can be retained.

Figure 9:
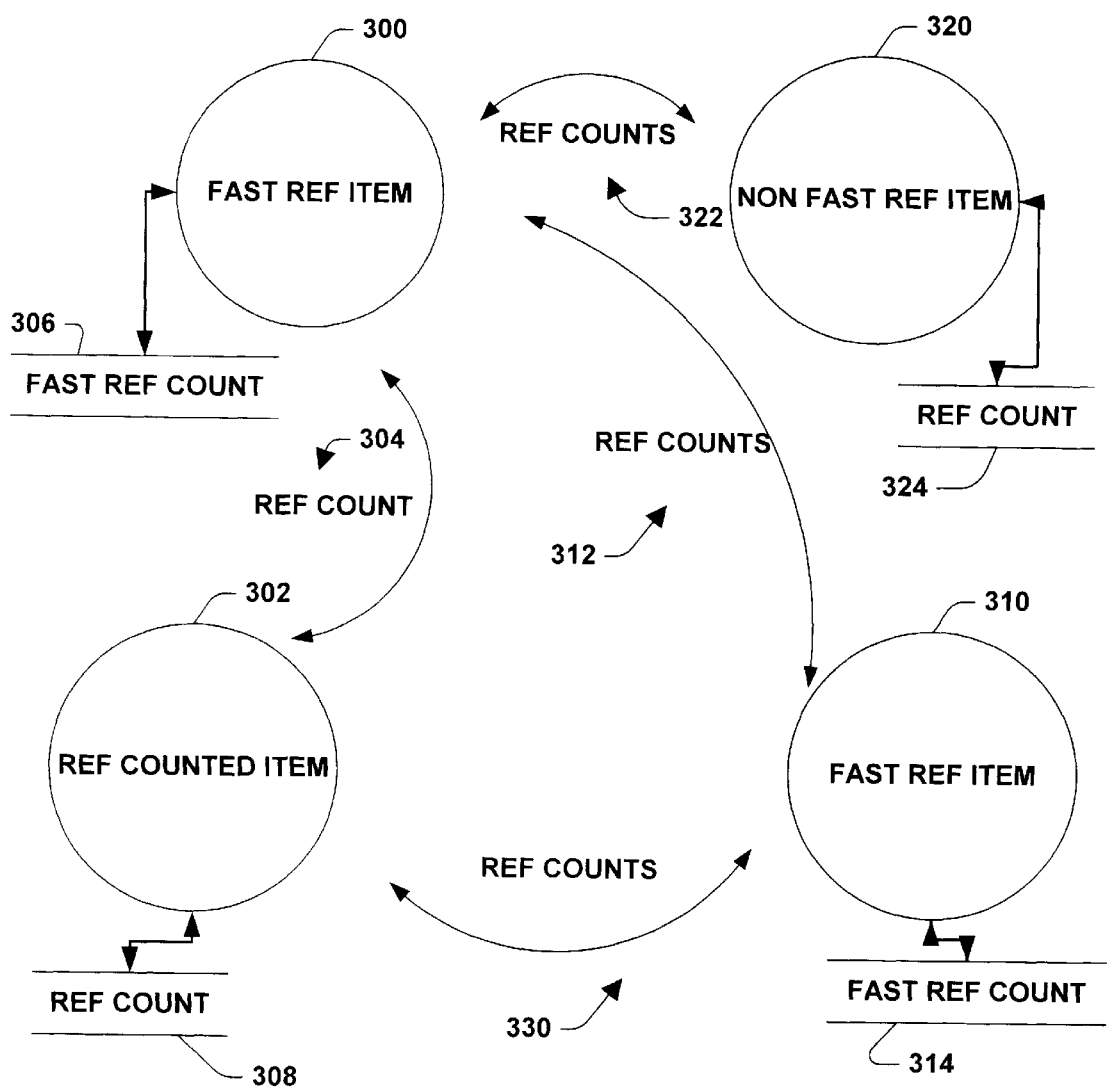
FIG. 9 is a data flow diagram illustrating a sample data flow, in accordance with an aspect of the present invention.

Turning now to FIG. 9, a sample data flow through an aspect of the present invention is illustrated. A fast reference item 300 creates a reference counted item 302. The reference counted item 302 has a reference count 308 associated with it. A copy of the reference count 304 is passed to the fast reference item 300. The fast reference item 300 creates and stores a local value (e.g. a fast reference count) associated the reference count 304 in a fast ref data store 306. The fast ref count data store 306 can contain a value different from the value stored in the ref count data store 308. Other fast referencing items 310 may seek to acquire a reference to the reference counted item 302.

In accordance with an aspect of the present invention, the fast referencing items 310 examine the fast reference count stored in the ref count 306 data store. If the fast referencing items 310 determine that references are available to be acquired, then the fast referencing items 310 can employ an atomic operation (e.g. InterlockedCompareExchange( )) to reduce the number of available references in the fast ref count 306 data store by an amount equal to the number of references acquired by the fast referencing items 310. The fast referencing items 310 store a value associated with the number of references acquired in a fast ref count 314 data store. The fast referencing items 310 may in turn be examined for the availability of references and may have their "extra" references acquired.

When the fast referencing items 310 are done with the acquired references, the fast referencing items 310 may employ an atomic operation to increase the number of available references in the fast ref count 306 data store by an amount equal to the number of references released by the fast referencing items 310. The fast referencing items 310 may also acquire a lock, return the acquired references to the reference counted object 302 by decreasing the reference count stored in the ref count 308 data store, and release the lock.

The fast referencing items 310 may also determine that by acquiring one or more references from the fast referencing item 300, that the available references stored in the fast ref count 306 data store have been exhausted. The fast referencing items 310 may thus attempt to acquire additional references to the reference counted item 302 and either retain the additional references for themselves, or assign the additional references to the fast referencing item 300.

Non-fast referencing items 320 may also seek to acquire a reference to the reference counted item 302. In accordance with an aspect of the present invention, the non-fast referencing items 320 examine the count stored in the fast ref count 306 data store. If the non-fast referencing items 320 determine that references are available to be acquired, then the non-fast referencing items 320 can employ an atomic operation (e.g. InterlockedCompareExchange( )) to reduce the number of available references in the fast ref count 306 data store by an amount equal to the number of references acquired by the non-fast referencing items 320. The non-fast referencing items 320 may also directly de-reference the reference counted item 302 or return the acquired references to the fast referencing item 300.

Although one acquiring fast referencing item 310 and one acquiring non-fast referencing item 320 are illustrated, it is to be appreciated by one skilled in the art that a greater or lesser number of fast referencing items and/or non-fast referencing items may be employed in accordance with the present invention.

Throughout the discussion associated with FIGS. 1 through 8, the term "item" has been employed (e.g. reference counted item, fast referencing item, non-fast referencing item). It is to be appreciated by one skilled in the art that the meaning of the term "item" as so employed can include, but is not limited to, memory locations, data structures, objects, processes and/or threads of executions.

Figure 10:
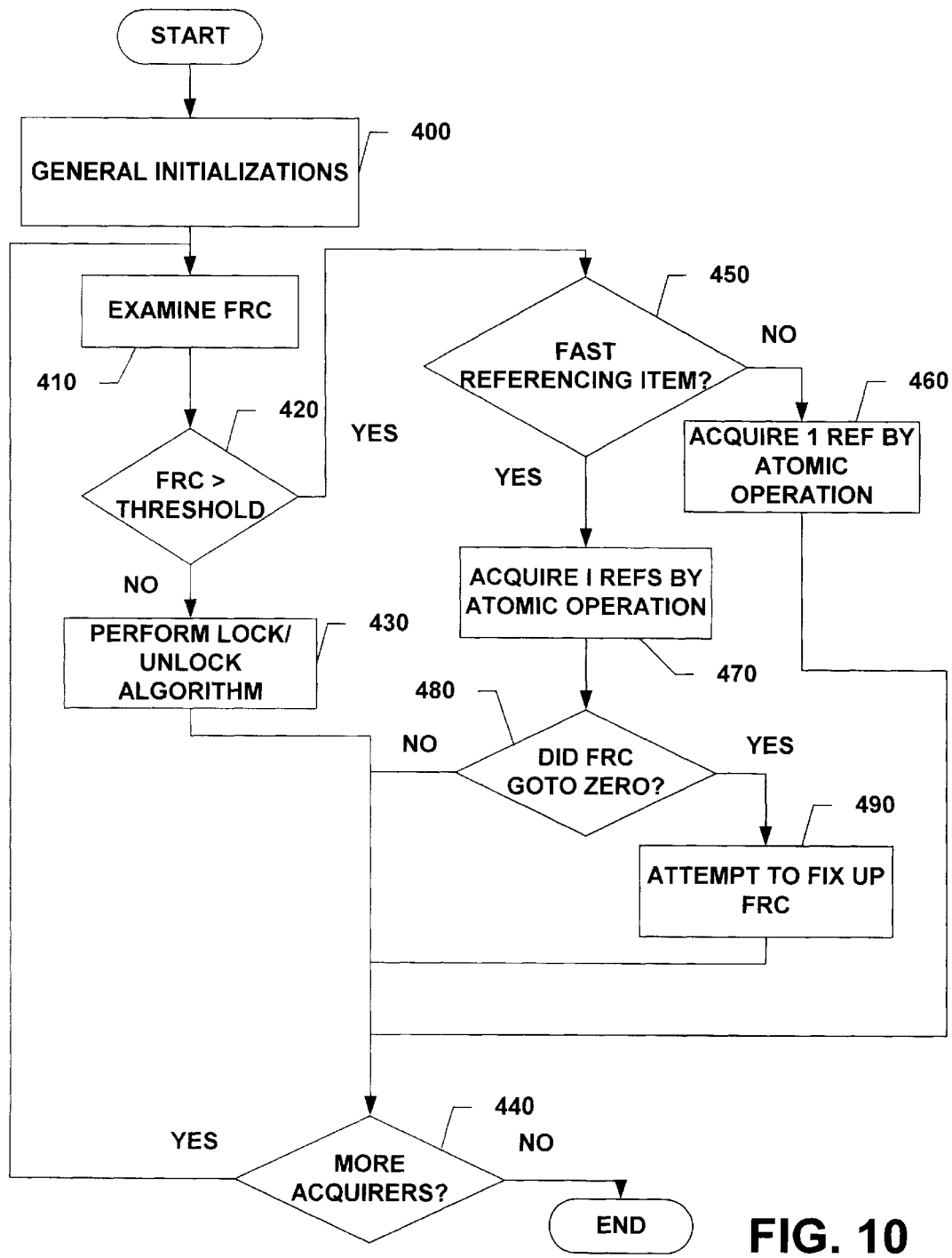
FIG. 10 is a flow chart illustrating a method for acquiring a reference to a reference counted item, in accordance with an aspect of the present invention.
Figure 11:
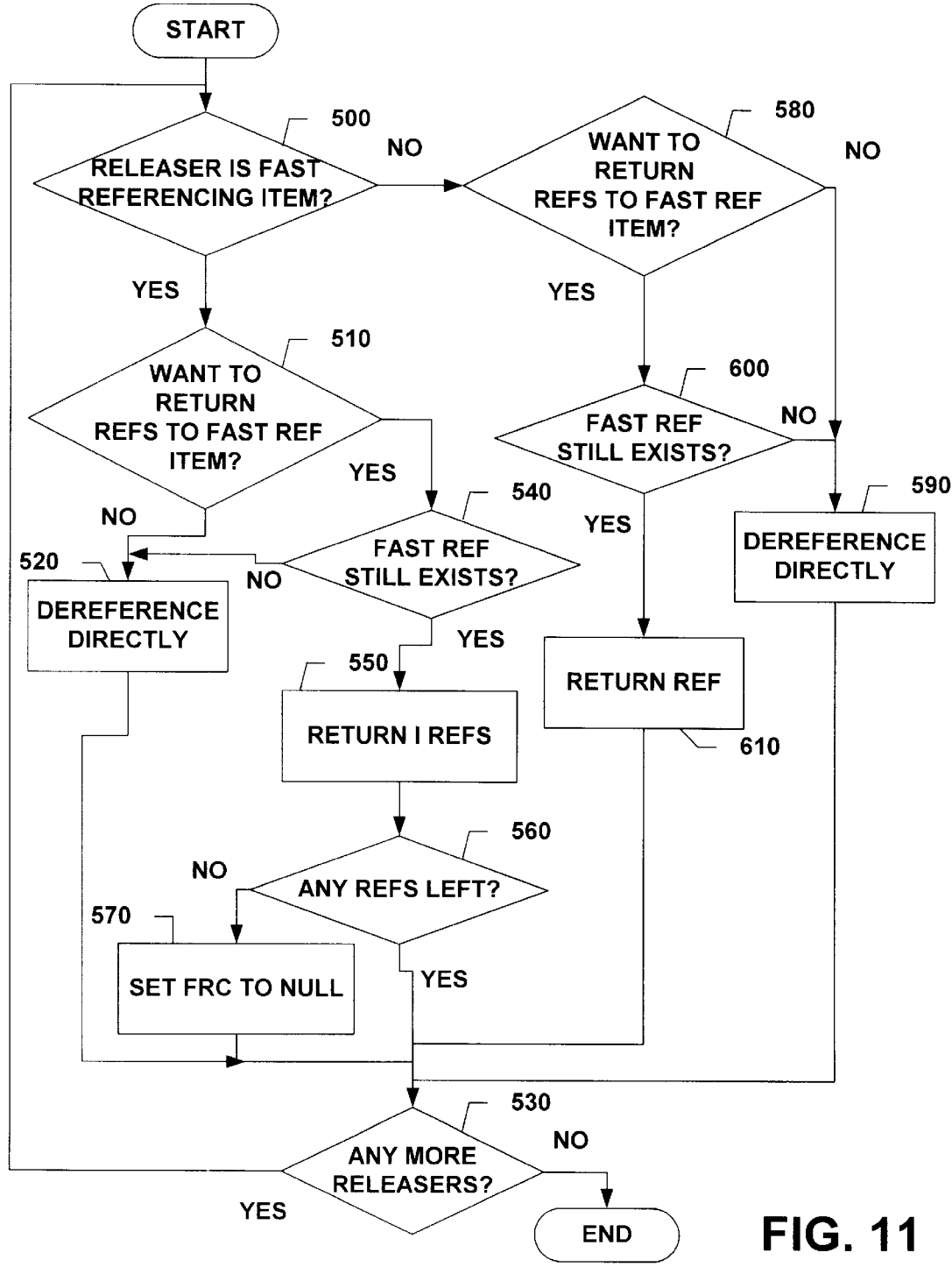
FIG. 11 is a flow chart further illustrating a method for releasing a reference to a reference counted item, in accordance with an aspect of the present invention.

In view of the exemplary systems shown and described above, a methodology, which may be implemented in accordance with the present invention, will be better appreciated with reference to the flow diagrams of FIG. 10 and FIG. 11. While, for purposes of simplicity of explanation, the methodologies of FIG. 10 and FIG. 11 are shown and described as a series of steps, it is to be understood and appreciated that the present invention is not limited by the order of the steps, as some steps can, in accordance with the present invention, occur in different orders and/or concurrently with other steps from that shown and described herein. Moreover, not all illustrated steps may be required to implement a methodology in accordance with the present invention.

Turning now to FIG. 10, a method for acquiring a reference to a reference counted item is flow-charted. At step 400, general initializations are performed. For example, a fast referencing item may be created, a reference counted object may be created, a reference count may established in the reference counted object, and a local value associated with the reference count (e.g. a fast reference count (FRC)) may be established. At step 410 an item seeking to acquire a reference to the reference counted item of step 400 examines the FRC to determine whether the fast referencing item of step 400 has any references available for acquisition.

At step 420, a determination is made concerning whether the FRC is greater than a pre-determined threshold. If at step 420 the determination is NO, then at step 430 a conventional method for acquiring a reference employing locking, accessing and unlocking is performed. At step 440, a determination is made concerning whether there are any more acquirers? If the determination at step 440 is YES, then control returns to step 410, otherwise the method concludes. If the determination at step 420 is YES, then at step 450 a determination is made concerning whether the acquiring item is a fast referencing item? If the determination at step 450 is NO, then at step 460 the non-fast referencing item acquires one reference to the reference counted item of step 400, employing an atomic operation to manipulate the FRC, after which control passes to step 440. If the determination at step 450 is YES, then at step 470 the acquiring fast referencing item acquires I references, I being an integer. In step 470 an atomic operation is employed to manipulate the FRC of the item from which the references were acquired.

At step 480 a determination is made concerning whether the acquisition of step 470 forced the FRC in the item from which the references were acquired to zero. If the determination at step 480 is NO, then control passes to step 440. But if the determination at step 480 is YES, then at step 490 the acquiring fast reference item may attempt to fix up the FRC of the fast referencing item from which the references were acquired. For example, the acquiring fast referencing item may examine the reference count of the reference counted item of step 400 and determine whether additional references are available. If such additional references are available, then the acquiring fast reference item can use a lock, access and unlock method to acquire the additional references and can assign the additional references to the fast referencing item whose FRC was forced to zero. Alternatively, the acquiring fast referencing item can retain the additional references, which will subsequently be available for acquisition by other acquiring items.

Turning now to FIG. 11 a method for releasing one or more references to a reference counted item is flow-charted. At step 500, a determination is made concerning whether the item releasing the one or more references is a fast referencing item. If the determination at step 500 is YES, then at step 510 a determination is made concerning whether the releasing item wants to return the one or more references to the fast referencing item from which it acquired the references. If the determination at step 510 is NO, then at step 520 the releasing item de-references the reference counted item directly, after which control passes to step 530. At step 530 a determination is made concerning whether there are any more releasing items. If the determination at step 530 is YES, then control passes to step 500, otherwise the method concludes. If at step 510 the determination was YES, then at step 540 a determination is made concerning whether the fast referencing item from which the references were acquired still exists. If the determination at step 540 is NO, then control passes to step 520. Otherwise, if the determination at step 540 is YES, then at step 550 the returning item returns I references, I being an integer greater than or equal to one. The returning item may return all or less than all of the references it acquired from the fast referencing item. At step 560, a determination is made concerning whether the releasing item has any references to the reference counted item left. If the determination is NO, then the releasing item no longer references the reference counted item and at step 570 sets the releasing item's FRC to a NULL value, indicating that it no longer references the reference counted item, after which control passes to step 530. If the determination at step 560 is YES, then the releasing item still references the reference counted item, and thus control passes to step 530.

If the determination at step 500 was NO, that the releasing item is not a fast referencing item, and at step 580 a determination is made concerning whether the releasing item wants to return its reference to the fast referencing item from which it acquired the reference. If the determination at step 580 is NO, then at step 590 the releasing item de-references the reference counted item directly, after which control passes to step 530. If at step 580 the determination was YES, then at step 600 a determination is made concerning whether the fast referencing item from which the references were acquired still exists. If the determination at step 600 is NO, then control passes to step 590. Otherwise, if the determination at step 600 is YES, then at step 610 the returning item returns its reference to the fast referencing item from which it acquired the reference, after which control passes to step 530.

Figure 12:
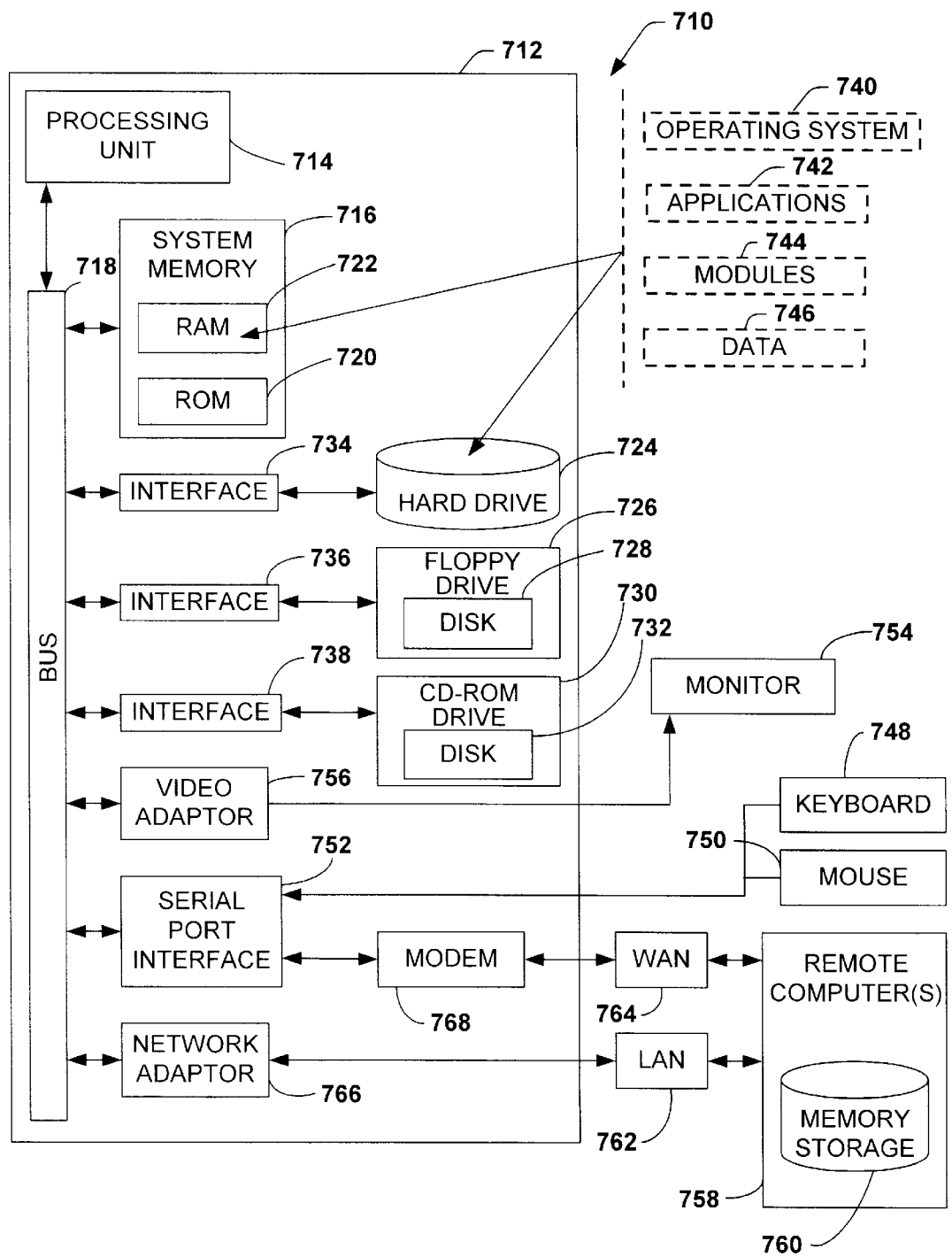
FIG. 12 is a schematic block diagram of an exemplary operating environment for a system configured in accordance with the present invention.

With reference to FIG. 12, an exemplary environment 710 for implementing various aspects of the invention includes a computer 712, including a processing unit 714, a system memory 716, and a system bus 716 that couples various system components including the system memory 716 to the processing unit 714. The processing unit 714 may be any of various commercially available processors. Dual microprocessors and other multi-processor architectures also can be used as the processing unit 714.

The system bus 716 may be any of several types of bus structure including a memory bus or memory controller, a peripheral bus, and a local bus using any of a variety of commercially available bus architectures. The system memory 716 includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g. for reading a CD-ROM disk 732 or to read from or write to other optical media. The hard disk drive 724, magnetic disk drive 726, and optical disk drive 730 are connected to the system bus 716 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program data 746. The operating system 740 in the illustrated computer is, for example, the "Microsoft® Windows® NT" operating system, although it is to be appreciated that the present invention may be implemented with a variety of commercially available operating systems or combinations of operating systems.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 716, but may be connected by other interfaces, such as a parallel port, a game port, a universal serial bus ("USB"), an IR interface, etc. A monitor 754 or other type of display device is also connected to the system bus 716 via an interface, such as a video adapter 756. In addition to the monitor 754, a computer 712 typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, may be connected to the system bus 716 via the serial port interface 752 to enable communications, for example, via POTS. In an alternative embodiment, the modem 768, which may be internal or external, may be connected to the system bus 716 via the network adaptor 766 to enable communications, for example, via DSL and/or modem. In a networked environment, program modules depicted relative to the computer 712, or portions thereof, may be stored in the remote memory storage device 760. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as that term is interpreted as a transitional word in a claim.

What is claimed is:

1. A system for fast referencing a reference counted item (RCI), comprising:
    a first fast referencing item;
    a fast reference count (FRC); and
    a fast reference count creator adapted to establish the FRC, where the FRC is associated with the first fast referencing item, the FRC having a value F associated with the RCI, the value F being initially greater than G, G being a value representative of the number of fast referencing items and non-fast referencing items referencing the RCI;
    wherein one or more second referencing items seeking to reference the RCI can employ the FRC to facilitate accessing the RCI.

2. The system of claim 1, wherein the fast reference count creator stores the value F in one or more bits in a pointer to the RCI.

3. The system of claim 2, wherein the FRC will be set to the value F, F being less than X, X being the reference count associated with the RCI.

4. The system of claim 3, wherein F will be set to equal to X–1.

5. The system of claim 2, wherein the one or more bits storing the FRC are contiguous.

6. The system of claim 2, wherein the one or more bits storing the FRC are not contiguous.

7. The system of claim 6, employing three bits to store the FRC.

8. The system of claim 1, further comprising, a processor adapted to process the one or more second referencing items, wherein the second referencing items selectively acquire one or more second references to the RCI by employing the FRC.

9. The system of claim 8, wherein the one or more second referencing items selectively acquire the one or more second references to the RCI from the first fast referencing item when the value of the FRC associated with the first fast referencing item is greater than a pre-determined threshold value A, A being an integer.

10. The system of claim 9, wherein A equals zero.

11. The system of claim 9, wherein the one or more second referencing items are operable to release one or more second references to the RCI.

12. The system of claim 11, wherein the one or more second referencing items de-reference the RCI directly.

13. The system of claim 11, wherein the one or more second referencing items return the one or more second references to the first fast referencing item from which the one or more second referencing items acquired the one or more second references.

14. The system of claim 11, wherein the second referencing item is a data structure, an object, a process or a thread of execution.

15. The system of claim 1, wherein the reference counted item is one of a memory location, a data structure, and an object.

16. The system of claim 1, wherein the first referencing item is a data structure, an object, a process or a thread of execution.

17. A method for fast referencing a reference counted item, comprising:
    setting a first reference to a reference counted item, wherein setting the first reference causes a reference count X to be associated with the reference counted item, X being an integer greater than one;
    storing the address of the reference counted item in a pointer to the reference counted item; and
    storing a first local value associated with the reference count X, where the first local value is associated with the first referencing item.

18. The method of claim 17, further comprising:
    one or more second referencing items obtaining one or more second references to the reference counted item, wherein obtaining a second reference includes:
    examining the first local value associated with the reference count X; and
    selectively performing an atomic exchange wherein the value of the first local value is reduced by an amount I, I being an integer, and wherein a second referencing item establishes a second local value associated with the reference count X, where the second local value is set to the integer value I–1, and where the second local value is associated with the second referencing item.

19. The method of claim 18, further comprising:
    a releasing item releasing one or more second references to the reference counted item, wherein releasing a second reference includes, de-referencing the reference counted item.

20. The method of claim 19, wherein de-referencing the reference counted item includes:
    reducing the reference count X by an amount equal to the number of references held by the releasing item; and
    setting the second local value in the releasing item to a value J, J being an integer, J indicating that the releasing item no longer has a reference to the reference counted item.

21. The method of claim 20, wherein J equals zero.

22. The method of claim 18, further comprising:
    a releasing item releasing one or more second references to the reference counted item, wherein releasing a second reference includes:
    performing an atomic exchange wherein the value of the first local value associated with the item from which the releasing item acquired its reference to the reference counted object is increased by an amount I, I being an integer equal to a number of references acquired by the releasing item; and
    setting the second local value in the releasing item to a pre-defined value J, J being an integer, where J indicates that the releasing item no longer has a reference to the reference counted object.

23. The method of claim 18, wherein selectively performing the atomic exchange occurs when the value of the first local value is greater than a pre-determined threshold value S, S being an integer.

24. The method of claim 23, wherein S equals zero.

25. The method of claim 18, wherein the second referencing item is a data structure, an object, a process or a thread of execution.

26. The method of claim 17 further comprising:
one or more second referencing items obtaining one or more second references to the reference counted item, wherein obtaining a second reference includes:
examining the first local value; and
selectively obtaining a second reference using the method for obtaining a first reference.

27. The method of claim 17, wherein one or more bits in the pointer are employed to store the first local value, the bits being contiguous.

28. The method of claim 17, wherein three bits are employed to store the first local value.

29. The method of claim 17, wherein one or more bits in the pointer are employed to store the first local value, the bits being not contiguous.

30. The method of claim 17, wherein the first local value is set to a value Y, Y being an integer less than the reference count X.

31. The method of claim 30, wherein Y is set to one less than the reference count X.

32. The method of claim 17, wherein the reference counted item is a memory location, a data structure or an object.

33. The method of claim 17, wherein the first referencing item is a data structure, an object, a process or a thread of execution.

34. A computer readable medium having computer executable instructions operable to perform the method of claim 17.

* * * * *